United States Patent
Marchand et al.

(10) Patent No.: US 7,240,653 B2
(45) Date of Patent: Jul. 10, 2007

(54) SYSTEM FOR ASSISTING A MAIN ENGINE START-UP

(75) Inventors: David G. Marchand, Dunlap, IL (US);
John J. Bernardi, Chillicothe, IL (US);
David C. Orr, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/261,491

(22) Filed: Oct. 31, 2005

(65) Prior Publication Data
US 2007/0095321 A1 May 3, 2007

(51) Int. Cl.
*F02N 11/12* (2006.01)
*H02J 9/08* (2006.01)

(52) U.S. Cl. .................. 123/179.19; 320/104

(58) Field of Classification Search ............ 123/179.3, 123/179.4, 179.19, 179.28; 290/36 R; 320/104, 320/105
See application file for complete search history.

(56) References Cited

U.S. PATENT DOCUMENTS

| | | | |
|---|---|---|---|
| 4,490,620 A | 12/1984 | Hansen | |
| 4,935,689 A * | 6/1990 | Fujikawa et al. ............. 322/1 |
| 5,255,733 A | 10/1993 | King | |
| 5,331,821 A | 7/1994 | Hanson et al. | |
| 5,366,151 A | 11/1994 | King et al. | |
| 5,469,820 A | 11/1995 | Data et al. | |
| 5,528,901 A | 6/1996 | Willis | |
| 5,579,728 A | 12/1996 | Gotmalm | |
| 5,977,646 A | 11/1999 | Lenz et al. | |
| 5,977,647 A | 11/1999 | Lenz et al. | |
| 6,066,937 A * | 5/2000 | Gutierrez et al. ........... 320/104 |
| 6,234,932 B1 | 5/2001 | Kuroda et al. | |
| 6,242,873 B1 | 6/2001 | Drozdz et al. | |
| 6,321,707 B1 * | 11/2001 | Dunn ...................... 123/179.3 |
| 6,536,207 B1 | 3/2003 | Kamen et al. | |
| 6,624,533 B1 | 9/2003 | Swanson et al. | |
| 6,651,759 B1 | 11/2003 | Gruenwald et al. | |
| 6,850,037 B2 | 2/2005 | Bertness | |

(Continued)

FOREIGN PATENT DOCUMENTS

EP  1 178 458  2/2002

(Continued)

OTHER PUBLICATIONS

About Us . . . Newsroom, Thermo King Announces TriPac Auxiliary Power Unit, http://www.thermoking.com/aboutus/newsroom/pressDisplay.asp?id=329, Apr. 14, 2005, p. 1.

(Continued)

*Primary Examiner*—Tony M. Argenbright
*Assistant Examiner*—Arnold Castro
(74) *Attorney, Agent, or Firm*—Finnegan, Henderson, Farabow, Garrett & Dunner

(57) ABSTRACT

A method is provided for assisting a start-up of a work machine having a battery assembly and a main engine. The method may include starting an auxiliary power unit, and using electrical power generated by the auxiliary power unit to condition the battery assembly. The method may also include adding electrical power generated by the auxiliary power unit to electrical power generated by the battery assembly for a main engine cranking event.

23 Claims, 3 Drawing Sheets

U.S. PATENT DOCUMENTS

| | | |
|---|---|---|
| 6,856,879 B2 | 2/2005 | Arakawa et al. |
| 2004/0198254 A1 | 10/2004 | Mizui et al. |
| 2004/0199297 A1 | 10/2004 | Schaper et al. |
| 2005/0035657 A1 | 2/2005 | Brummett et al. |

FOREIGN PATENT DOCUMENTS

| | | |
|---|---|---|
| EP | 1 440 855 | 7/2004 |
| WO | WO 96/11817 | 4/1996 |
| WO | WO 2004/025098 | 3/2004 |

OTHER PUBLICATIONS

Willis Auxiliary Power System, "Stop Idling and Start Saving," http://www.auxiliarypowerdynamics.com, Sep. 23, 2005.

* cited by examiner

SYSTEM FOR ASSISTING A MAIN ENGINE START-UP

TECHNICAL FIELD

The present disclosure relates generally to internal combustion engines, and more particularly to a system and method for assisting the start-up of an internal combustion engine of a work machine.

BACKGROUND

On and off highway vehicles, construction equipment, and other work machines may use on-board batteries to crank and start their main engines. Cranking and starting a main engine may draw a significant amount of power from a work machine's on-board battery. Typically, the on-board battery may be designed to provide only three to four main engine cranking events before depleting the energy stored therein. Thus, if the engine fails to start after repeated attempts, and/or if the battery loses enough charge due to internal leakage, then the charge present in the battery may be insufficient to start the main engine. It may be both costly and time consuming to bring in the necessary service equipment to remedy such a problem.

Cold weather conditions may exacerbate battery problems because batteries tend to lose significant amounts of charge in low temperature conditions. In order to compensate for the effects of the cold weather conditions, the battery capacity of the work machine may be significantly expanded to increase the amount of battery power available for the main engine start-up. However, expanding the battery capacity of the work machine may involve providing a relatively large battery assembly consisting of, for example, four or more batteries wired together to collectively provide the necessary power for starting the main engine. However, if the work machine fails to start and the battery charge in the large battery assembly becomes depleted, then service may still be required. Due to the expanded capacity of the large battery assembly, attempting to jump-start the work machine using a typical tow truck or other on-highway vehicle may overly tax that vehicle's power system. Accordingly, the use of larger capacity jump-starting equipment may be necessary, which may further increase costs and time delay.

At least one system has been developed to assist a main engine start while reducing battery capacity. For example, U.S. Pat. No. 5,528,901 to Willis discloses an auxiliary power system that replaces a typical battery pack (four relatively large lead-acid batteries) of a heavy-duty diesel engine. Willis' auxiliary power system includes a small auxiliary diesel engine, an air compressor, a compressed air accumulator, and a pneumatic starter fluid coupled to the accumulator and mechanically coupled to start the heavy-duty diesel engine. By using a pneumatic-based starting system, the auxiliary power system in Willis allows the elimination of the large lead-acid starter batteries and allows the mounting of substantially all of the auxiliary power system in the space once occupied by those batteries. However, according to Willis, the accumulator is not normally part of the original equipment of the diesel engine and must be added with the auxiliary power assembly. Furthermore, in a retrofit application, the electric starter would have to be removed and replaced with a pneumatic or air starter. Thus it is apparent that use of Willis' auxiliary power system requires the removal, addition, and/or replacement of various diesel engine components. Furthermore, the addition of the pneumatic-based starting system and its related components may add to the complexity of the diesel engine. The added complexity may lead to increased costs associated with manufacturing, retrofitting, maintaining, and/or training operators and technicians to use and fix the new components.

The present disclosure is directed towards overcoming one or more of the problems set forth above.

SUMMARY OF THE INVENTION

A method is provided for assisting a start-up of a work machine having a battery assembly and a main engine. The method may include starting an auxiliary power unit, and using electrical power generated by the auxiliary power unit to condition the battery assembly. The method may also include adding electrical power generated by the auxiliary power unit to electrical power generated by the battery assembly for a main engine cranking event.

A main engine start-up system is provided. The main engine start-up system may include a starter motor configured to crank the main engine, a battery assembly configured to supply electrical power to the starter motor, and an auxiliary power unit configured to generate electrical power for conditioning the battery assembly. The electrical power generated by the auxiliary power unit may be added to the electrical power generated by the battery assembly for a main engine cranking event.

A work machine is provided having a main engine start-up system. The main engine start-up system may include a starter motor configured to crank the main engine, a battery assembly configured to supply electrical power to the starter motor, and an auxiliary power unit configured to generate electrical power for conditioning the battery assembly. The electrical power generated by the auxiliary power unit may be added to the electrical power generated by the battery assembly during a main engine cranking event.

DETAILED DESCRIPTION

Figure 1:
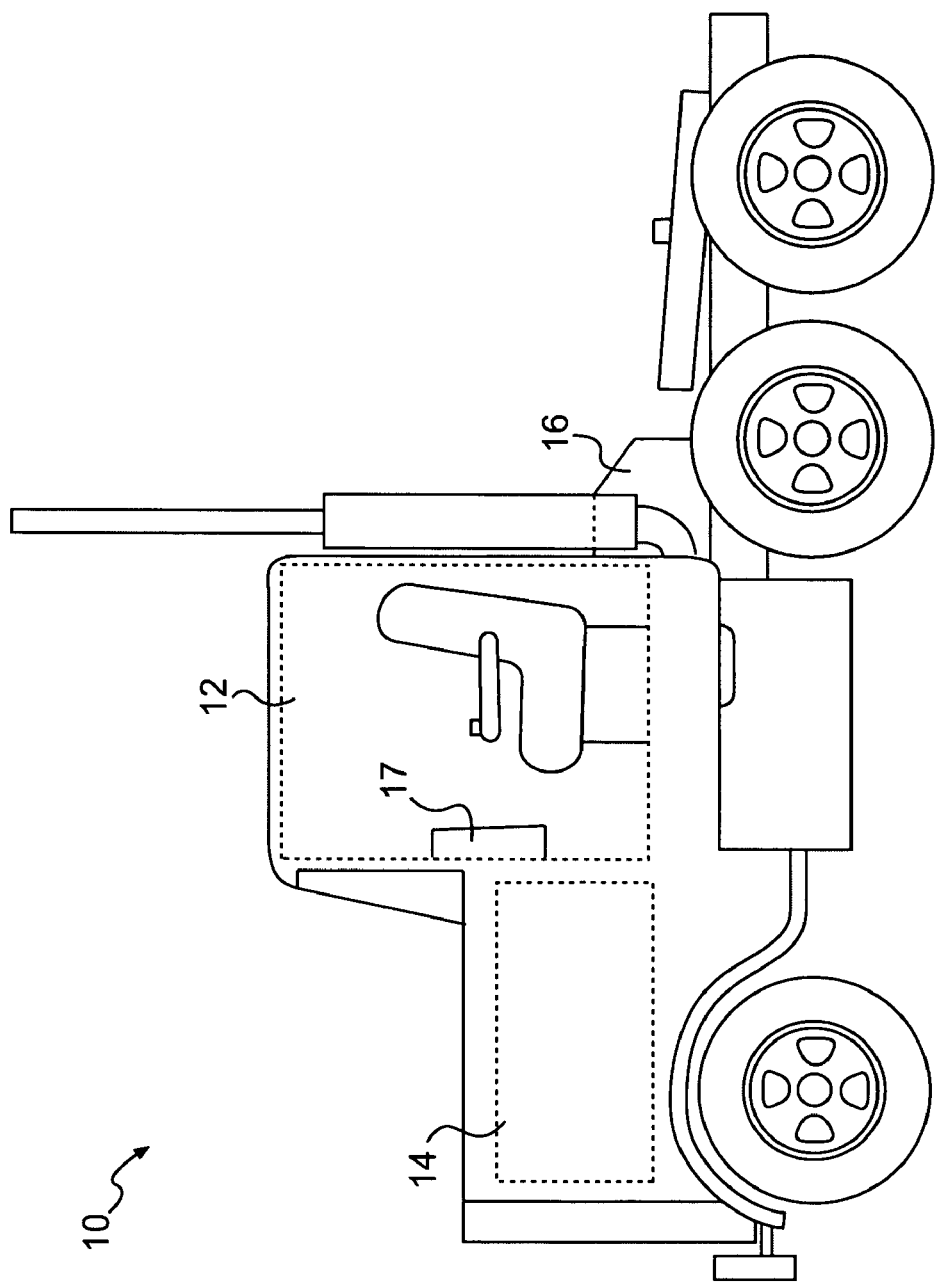
FIG. 1 is a diagrammatic view of a work machine, according to an exemplary disclosed embodiment.

FIG. 1 provides a diagrammatic view of a work machine 10 according to an exemplary disclosed embodiment. Work machine 10 may include a cab 12, a main engine 14, and an auxiliary power unit ("APU") 16. While work machine 10 may be an on-highway truck, it is contemplated that the present disclosure may be applicable to any other work machine that has an engine. For example, work machine 10 may include off-highway vehicles, passenger cars, construction equipment, earth-moving equipment, and generator sets.

Figure 2:
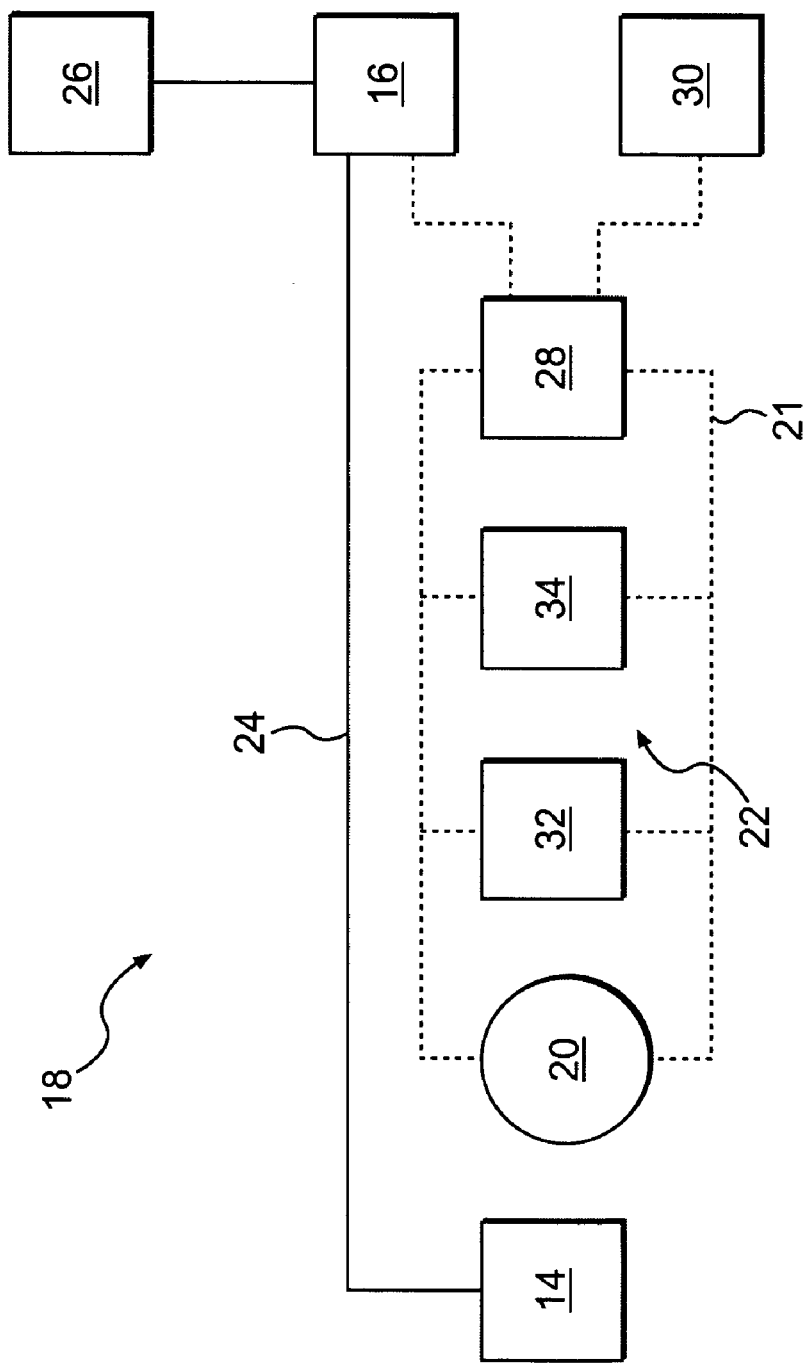
FIG. 2 is a block diagram of work machine components, according to an exemplary disclosed embodiment.

Main engine 14 may include an internal combustion engine that operates using diesel fuel, gasoline, gaseous fuels, or other types of fuel. It is contemplated that main engine 14 may provide power for operation of work machine 10, including electrical power to run devices inside cab 12. The devices may include, for example, refrigerators, televisions, radios, or any other devices designed to provide comfort to an operator seated within cab 12. Main engine 14 may produce electrical power to run these devices through use of an engine driven electrical generator (not shown). Main engine 14 may also have functional relationships with other work machine components. These components may be part of a system 18 shown in FIG. 2, and may include, for example, a starter motor 20, a battery assembly 22, a cooling system 24, a controller 26, a power electronics module ("PEM") 28, and a shore power module ("SPM") 30. The elements of system 18 may be interconnected by one or more electrical connections 21, that may include, for example, electrical wires or other suitable conductors known in the art.

Starter motor 20 may be configured to crank main engine 14. Starter motor 20 may include, for example, a twelve volt DC electric motor and a solenoid (not shown) attached to the electric motor for energizing starter motor 20. Once connected to a power source, such as battery assembly 22, starter motor 20 may crank main engine 14 by ways known to those skilled in the art.

Battery assembly 22 may include one or more devices configured to produce electricity. For example, it is contemplated that battery assembly 22 may include first and second batteries 32 and 34 connected in parallel. Battery assembly 22 may be operatively connected to starter motor 20 so that in operation, battery assembly 22 may provide an initial source of power for starter motor 20 during the main engine cranking event. Once main engine 14 is cranked and started, and is independently up and running, battery assembly 22 may be recharged by a main engine driven alternator (not shown) by ways known to those skilled in the art. It is also contemplated that a combination starter-generator (not shown) may be used in place of starter motor 20 and the engine driven alternator. The combination starter-generator may be electrically connected to main engine 14 and battery assembly 22, and may be configured to allow current to flow through the starter-generator in both directions. Thus, the starter-generator may act as a starter to start main engine 14, and, once main engine 14 is operating, the starter-generator may function as a generator for recharging battery assembly 22. The recharging of battery assembly 22 may help to ensure that battery assembly 22 possesses enough charge to perform another main engine cranking event during a subsequent starting request.

APU 16 may include an auxiliary engine, which may include a smaller internal combustion engine separate from main engine 14. Due to APU 16 being of a smaller size than main engine 14, significantly less electrical power may be required during start-up of APU 16 as compared to that required for start-up of main engine 14. The initial source of power for starting APU 16 may come from battery assembly 22, and once started, APU 16 may be fueled by diesel fuel, gasoline, gaseous fuels, or other types of fuel. As APU 16 runs, it may condition battery assembly 22 and may provide electrical power that may be additive to that provided by battery assembly 22. APU 16 may be electrically connected to battery assembly 22 through PEM 28. PEM 28 may include power converters that may convert voltage supplied by APU 16 into lower voltages for conditioning battery assembly 22 and/or to power other work machine 10 components that may not require or cannot handle the full APU 16 voltage. Additionally or alternatively, APU 16 may be operatively connected to a belt drive alternator (not shown) electrically connected to battery assembly 22 through any suitable electrical connection (not shown), such as, for example, electrical connection 21. APU 16 may drive the belt driven alternator, which in turn may supply voltage, such as, for example, 12 VDC, to charge battery assembly 22.

The conditioning of battery assembly 22 may include the acts of recharging and/or warming battery assembly 22. As previously discussed, APU 16 may recharge battery assembly 22 by supplying electrical current to battery assembly 22 through PEM 28 and/or through use of a belt driven alternator (not shown). Additionally or alternatively, APU 16 may also provide heat for warming battery assembly 22. The heat may be supplied by one or more sources. For example, it is contemplated that the heat may be generated within battery assembly 22 during recharging because heat may be produced when the recharging current passes through internal resistance in battery assembly 22. Also, when electrical power is discharged from battery assembly 22, heat may be produced as a byproduct. It is also contemplated that the heat may be generated by APU 16 itself, which gives off heat while it runs. It is further contemplated that the heat may be transferred to battery assembly 22 from cooling system 24, and/or through heat transfer from other work machine components.

SPM 30 may include a receptacle (not shown) or any other suitable electrical connection configured to electrically connect PEM 28 with a power supply external to work machine 10. Through its connection with the external power supply, SPM 30 may provide electrical power while work machine 10 is at rest or at a destination point. Using SPM 30 may eliminate the need for idling main engine 14, as the external power supply may provide the electrical power for running work machine components. It is further contemplated that power from SPM 30 may be used as a supplement to, or in replacement of, the power supplied by APU 16. SPM 30 may perform functions similar to those describe by APU 16, including, for example, conditioning battery assembly 22, and/or providing additive electrical power to assist the main engine cranking event. In one embodiment, SPM 30 may warm battery assembly 22 by powering one or more battery warming devices (not shown). Furthermore, like the power supplied by APU 16, the power supplied by SPM 30 may be down-converted by PEM 28 before being directed to other work machine 10 components.

Cooling system 24 may circulate coolant through main engine 14 and APU 16. In one embodiment, main engine 14 and APU 16 may share coolant to minimize cost/weight. As such, cooling system 24 may help to maintain stable main engine 14 and APU 16 temperatures under varying operating conditions. The circulation of the coolant may occur through the use of pipes, hoses, and/or coolant reservoirs (not shown). The coolant may be a liquid, and may include, for example, water, ethylene glycol, and other suitable solutions. Additionally or alternatively, main engine 14 and APU 16 may not share coolant, but rather, may be individually supplied with coolant. In such an embodiment, cooling system 24 may also include pumps (not shown) to generate heat through friction, heaters, and/or other suitable devices capable of affecting coolant temperature. APU 16 may power the pumps, heaters, and/or other devices to affect the temperature of the coolant circulating through main engine 14. Additionally or alternatively, SPM 30 may power the pumps, heaters, and/or other devices to warm main engine 14. Warming main engine 14 and its components may condition main engine 14 so that it may be easier to start.

Controller 26 may take many forms, including, for example, a computer based system, a microprocessor based system, a microcontroller, or any other suitable control type circuit or system. Controller 26 may also include memory for storage of a control program for operation and control of main engine 14, APU 16, and/or other work machine components. Furthermore, controller 26 may communicate with a timer (not shown) that may track how long APU 16 has been running after being started, and a set of sensors (not shown) measuring temperature, battery voltage, power usage, and/or values indicative thereof. From the sensed information and/or values indicative thereof, controller 26 may determine whether activation of APU 16 may be required before performing the main engine cranking event.

Cab 12 may include an enclosed area of work machine 10 configured to house the operator. Cab 12 may also include a dashboard (instrument panel) 17 that may contain dials and/or controls for conveying information and for operating work machine 10 and its various components. Dashboard 17 may also include a display system and a user interface (not shown). The display system may include a computer monitor with an audio speaker, video screen, or any other suitable visual display device that may convey information to the operator. For example, if APU 16 should be started to prepare for a start-up of main engine 14, then the display system may communicate this information to the operator. It is further contemplated that the user interface may include a keyboard, touch screen, number pad, or any other suitable input device.

The display system on dashboard 17 may also communicate with controller 26 to, for example, inform the operator of the need to start APU 16 to recharge and warm battery assembly 22. It is also contemplated that controller 26 may automatically start APU 16 when the operator performs the main engine cranking event, if the main engine cranking event fails to start main engine 14 or if controller 26 determines that there is insufficient battery charge in battery assembly 22. Additionally or alternatively, instead of carrying out these processes based entirely on battery charge, temperature may also play a role. For example, if the temperature of the environment or a machine component is below a threshold value, controller 26 may suggest to the operator that the operator should run APU 16 prior to performing the main engine cranking event. It is further contemplated that the operator may simply know from training and/or experience when to start APU 16 to assist start-up of main engine 14. For example, upon recognizing that work machine 10 has been turned off and has been subjected to cold weather conditions for an extended period of time, the operator may realize that APU 16 should be started prior to attempting the main engine cranking event.

Figure 3:
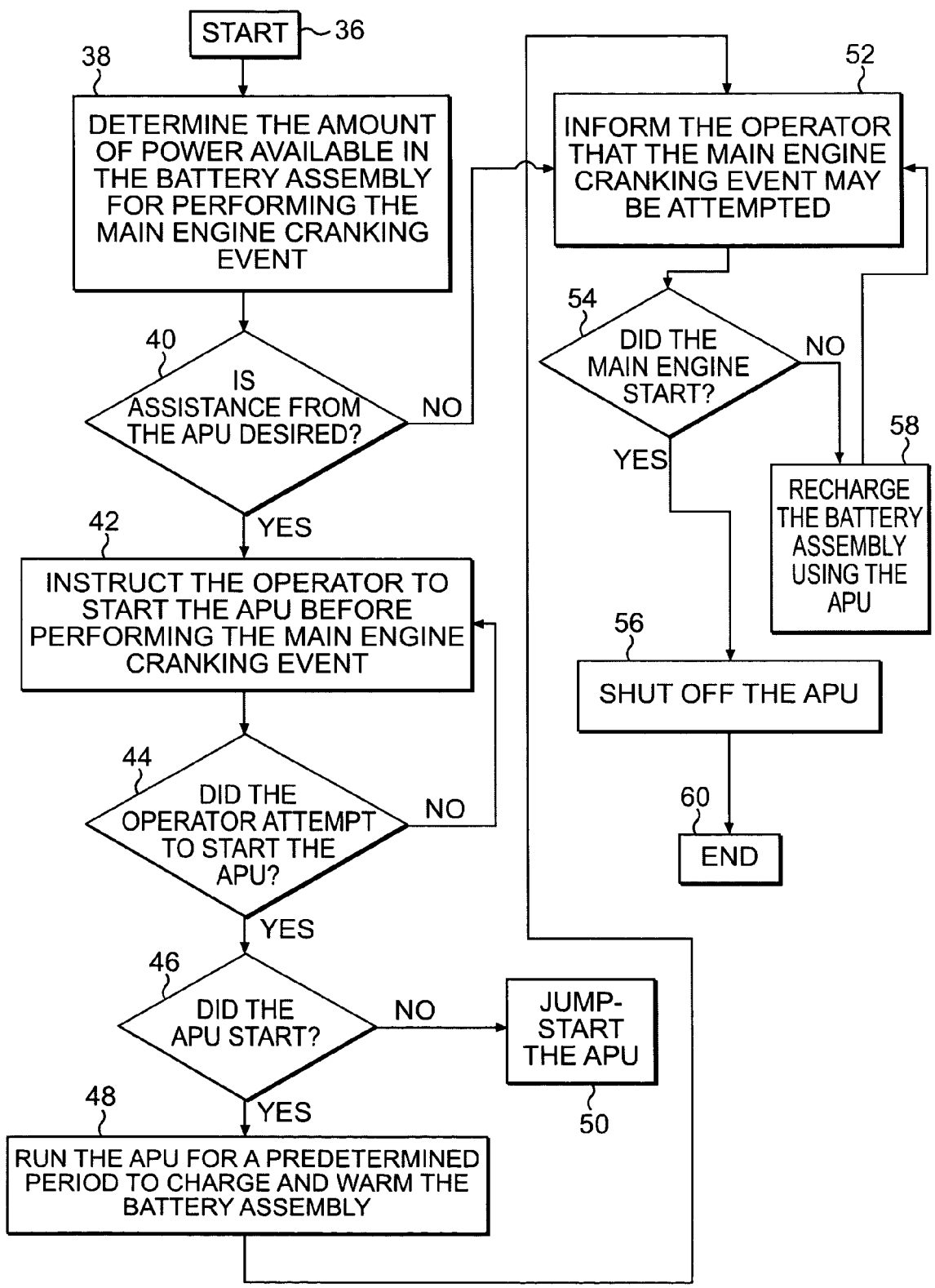
FIG. 3 is a flow diagram of a method, according to an exemplary disclosed embodiment.

FIG. 3 illustrates a flow diagram depicting an exemplary method of using system 18 to assist the starting of main engine 14. The method may begin (step 36) when the operator enters cab 12. A determination may be made as to the amount of power available for performing the main engine cranking event and start-up of main engine 14 (step 38). For example, controller 26, using various sensors, may communicate with a battery sensor (not shown) that may be able to sense battery charge in battery assembly 22, or some value indicative thereof. It is also contemplated that controller 26 may communicate with a temperature sensor (not shown) capable of determining the temperature of the environment and/or work machine 10 and its various components. Furthermore, controller 26 may include in its memory, tables, graphs, and/or equations that may allow it to determine, based on the temperature values, both the charge present in battery assembly 22 and anticipated battery performance. Additionally or alternatively, the operator may determine whether there is sufficient power for the main engine cranking event based on environmental conditions and/or personal experience.

If it is determined that the charge in battery assembly 22 is sufficient for performing the main engine cranking event and starting main engine 14, then assistance from APU 16 may not be desired (step 40: No), and the operator may be informed as such (step 52). If, on the other hand, it is determined that the charge is insufficient, then assistance from APU 16 may be desired (step 40: Yes). Accordingly, the operator may be instructed to start APU 16 prior to performing the main engine cranking event (step 42). This instruction may be displayed to the operator by the display on dashboard 17. Once alerted, the operator may either attempt to start APU 16 or ignore the alert (step 44). If the operator ignores the alert, then the operator may be re-alerted (step 42) as a reminder that APU 16 should be started. This may assure that the operator may not repeatedly attempt futile main engine cranking events. Additionally or alternatively, controller 26 may automatically trigger start-up of APU 16 after a failed main engine cranking event if battery assembly 22 holds enough charge to start APU 16, but not enough to start main engine 14. It is also contemplated that controller 26 may prevent any electrical power from activating starter motor 20 until APU 16 is started. It is further contemplated that the operator may know from experience when the battery charge may be low, and thus, the operator may be able to anticipate when APU 16 should be started prior to performing the main engine cranking event, and thus, may start APU 16 without being alerted or instructed to do so.

Once the operator attempts to start APU 16, the next step may involve determining whether APU 16 actually started (step 46). If APU 16 did not start, then a jump-start may be required (step 50). Once APU 16 is started or jump-started, then it may run for a predetermined period to charge and warm battery assembly 22 (step 48). The period may be set according to the temperature of battery assembly 22. For example, the period may correspond to the length of time it takes to warm battery assembly 22 until a threshold temperature is reached. The threshold temperature may be the minimum temperature wherein battery assembly 22 may still be capable of providing enough electrical power to perform a main engine cranking event and successful start-up of main engine 14. Additionally or alternatively, the period may correspond to the length of time it takes to recharge battery assembly 22 such that it may have enough charge to perform the main engine cranking event and provide for the successful start-up of main engine 14. When the time expires, the battery temperature has reached a threshold value, and/or the battery charge is sufficient, the operator may be informed that the main engine cranking event may be attempted (step 52).

Next, a determination may be made as to whether main engine 14 has started (step 54). If the main engine cranking event fails to start main engine 14, then a subsequent main engine cranking event may be attempted. In between main engine cranking events, APU 16 may warm and recharge battery assembly 22 (step 58) to ensure that after each failed main engine cranking event, battery assembly 22 may hold enough electrical power for a subsequent attempt.

Upon successful start-up of main engine 14, APU 16 may be shut off manually by the operator or automatically by controller 26 (step 56), and the process may end (step 60). Shutting off APU 16 may help to conserve fuel, as main engine 14 may be fully capable of producing electrical power once it is running.

INDUSTRIAL APPLICABILITY

The disclosed system 18 for assisting an engine start-up may have applicability in diesel fueled work machines.

System 18 may have particular applicability in aiding the start-up of a main engine 14 of a work machine 10 in cold weather conditions.

Work machine 10 may include a battery assembly 22 configured to supply electrical power to a starter motor 20 when a main engine cranking event and start-up of main engine 14 is requested. However, environmental conditions may decrease the charge in battery assembly 22 so that it may be incapable of providing enough electrical power to starter motor 20 to perform the main engine cranking event and start main engine 14. For example, in cold weather conditions, battery assembly 22 may lose a significant amount of charge. Thus, at low temperatures, the power available from battery assembly 22 may be much less than the power available at warmer temperatures. An auxiliary power unit ("APU") 16, which may include a small internal combustion engine, may be used to counteract the negative effects of the cold weather conditions. Once APU 16 is running, the power produced by APU 16 may recharge battery assembly 22. As battery assembly 22 is recharged, its internal resistance may generate heat, which may cause a subsequent rise in its temperature. As battery assembly 22 warms, its ability to provide the necessary electrical power for a successful start-up of main engine 14 may increase accordingly. Furthermore, the electrical power generated by APU 16 may be additive to the electrical power generated by battery assembly 22, such that the combined electrical power from APU 16 and battery assembly 22 may be used during the main engine cranking event. Thus, by recharging and warming battery assembly 22, and by supplementing its power with additional electrical power, APU 16 may assist in bringing about a successful start-up of main engine 14.

Running APU 16 prior to performing the main engine cranking event may also provide other benefits. For example, circumstances may arise where main engine 14 may not start after performance of the main engine cranking event. However, that main engine cranking event may nonetheless deplete battery charge stored in battery assembly 22. By running APU 16 prior to initiating the next subsequent main engine cranking event, the depletion of battery charge may be avoided, since APU 16 may recharge battery assembly 22 such that the battery charge available for the next main engine cranking event may be substantially equivalent to the battery charge available during the prior main engine cranking event. This cycle of battery charge depletion (during the main engine cranking events) and battery recharging (after the main engine cranking events), may carry on almost indefinitely as APU 16 continues to run. With each unsuccessful main engine cranking event, the discharging of electrical power from battery assembly 22 during the cranking stage of the cycle may generate heat, which may warm battery 22, thus placing battery assembly 22 in better condition for subsequent main engine cranking events. Furthermore, the recharging stage of the cycle may also warm battery assembly 22. Accordingly, the likelihood of achieving a successful start-up of main engine 14 may increase as the number of unsuccessful main engine cranking events increases.

Using APU 16 as leverage to assist the start-up of main engine 14 may allow for a reduction in the size and/or number of batteries in battery assembly 22. Typically, work machine 10 may employ a relatively large battery assembly that may have a large charge capacity to ensure that main engine 14 may be started in cold weather conditions. APU 16 may replace one or more batteries within the large battery assembly. For example, the number of batteries in work machine 10 may be reduced from four to two. Thus, battery assembly 22 may only include relatively smaller first and second batteries 32 and 34. APU 16 may recharge and warm first and second batteries 32 and 34 while also providing additional power for starting main engine 14, thus making first and second batteries 32 and 34 more effective in providing the electrical power needed to start main engine 14. Because of their increased effectiveness, first and second batteries 32 and 34 may replace the large battery assemblies without sacrificing the ability to start main engine 14. Reducing the size and/or number of batteries may result in reductions in the initial manufacturing cost, weight, package space, owning and operating cost, and battery maintenance effort, for work machine 10.

In emergency situations where a jump-start may be required, the smaller battery capacity of battery assembly 22 may be more in line with the battery capacities of typical on-road vehicles, such as, for example, passenger cars, sport utility vehicles, pick-up trucks, and tow trucks. Accordingly, the battery charging capacities of these vehicles may be sufficient to jump-start APU 16. Once started, APU 16, may be used to initiate the main engine cranking event and start-up of main engine 14 in the manner described above.

It will be apparent to those skilled in the art that various modifications and variations can be made in the disclosed system and method without departing from the scope of the disclosure. Additionally, other embodiments of the disclosed system and methods will be apparent to those skilled in the art from consideration of the specification. It is intended that the specification and examples be considered as exemplary only, with a true scope of the disclosure being indicated by the following claims and their equivalents.

The invention claimed is:

1. A method for assisting a start-up of a work machine having a battery assembly and a main engine, the method comprising:
   starting an auxiliary power unit;
   using electrical power generated by the auxiliary power unit to condition the battery assembly; and
   adding electrical power generated by the auxiliary power unit to electrical power generated by the battery assembly for a main engine cranking event.

2. The method of claim 1, further including manually starting the auxiliary power unit when the battery assembly temperature falls below a threshold level.

3. The method of claim 1, further including manually starting the auxiliary power unit when the battery assembly charge falls below a threshold level.

4. The method of claim 1, further including automatically starting the auxiliary power unit when the battery assembly temperature falls below a threshold level.

5. The method of claim 1, further including automatically starting the auxiliary power unit when the battery assembly charge falls below a threshold level.

6. The method of claim 1, wherein if the main engine cranking event is unsuccessful, the auxiliary power unit is configured to recharge the battery assembly prior to a subsequent main engine cranking event.

7. The method of claim 1, wherein conditioning the battery assembly includes at least one of warming and recharging the battery assembly.

8. The method of claim 1, further including jump-starting the auxiliary power unit.

9. A main engine start-up system, comprising:
   a starter motor configured to crank the main engine;
   a battery assembly configured to supply electrical power to the starter motor; and an auxiliary power unit configured to generate electrical power for conditioning the battery assembly;

wherein the electrical power generated by the auxiliary power unit is added to the electrical power generated by the battery assembly for a main engine cranking event.

10. The system of claim 9, wherein the auxiliary power unit is configured to be manually started when the battery assembly temperature falls below a threshold level.

11. The system of claim 9, wherein the auxiliary power unit is configured to be manually started when the battery assembly charge falls below a threshold level.

12. The system of claim 9, wherein the auxiliary power unit is configured to be automatically started when the battery assembly temperature falls below a threshold level.

13. The system of claim 9, wherein the auxiliary power unit is configured to be automatically started when the battery assembly charge falls below a threshold level.

14. The system of claim 9, wherein if the main engine cranking event is unsuccessful, the auxiliary power unit is configured to recharge the battery assembly prior to a subsequent main engine cranking event.

15. The system of claim 9, wherein the battery assembly consists of only two batteries.

16. A work machine having a main engine start-up system, comprising:
    a starter motor configured to crank the main engine;
    a battery assembly configured to supply electrical power to the starter motor; and
    an auxiliary power unit configured to generate electrical power for conditioning the battery assembly;
    wherein the electrical power generated by the auxiliary power unit is added to the electrical power generated by the battery assembly during a main engine cranking event.

17. The work machine of claim 16, wherein the auxiliary power unit is configured to be manually started when the battery assembly temperature falls below a threshold level.

18. The work machine of claim 16, wherein the auxiliary power unit is configured to be manually started when the battery assembly charge falls below a threshold level.

19. The work machine of claim 16, wherein the auxiliary power unit is configured to automatically start when the battery assembly temperature falls below a threshold level.

20. The work machine of claim 16, wherein the auxiliary power unit is configured to automatically start when the battery assembly charge falls below a threshold level.

21. The work machine of claim 16, wherein if the main engine cranking event is unsuccessful, the auxiliary power unit is configured to recharge the battery assembly prior to a subsequent main engine cranking event.

22. The work machine of claim 16, wherein the battery assembly consists of only two batteries.

23. A start-up system for a main engine that is mounted on a machine frame, the start-up system comprising:
    a starter motor configured to crank the main engine;
    a battery assembly configured to supply electrical power to the starter motor; and
    an auxiliary power unit attached to the machine frame and configured to generate electrical power for conditioning the battery assembly;
    wherein the electrical power generated by the auxiliary power unit is added to the electrical power generated by the battery assembly for a main engine cranking event.

* * * * *